United States Patent

Anderson

[11] Patent Number: 5,979,112
[45] Date of Patent: Nov. 9, 1999

[54] SEEDLING PLANTER

[76] Inventor: George C. Anderson, 2425 SE. Moores St., Portland, Oreg. 97222

[21] Appl. No.: 08/988,266

[22] Filed: Dec. 10, 1997

[51] Int. Cl.⁶ ...................................................... A01G 9/02
[52] U.S. Cl. ................................................ 47/66.5; 47/85
[58] Field of Search ............................. 47/44, 66.1, 66.5, 47/77, 85, 86; 220/528, 529, 552, 553

[56] References Cited

U.S. PATENT DOCUMENTS

| | | | |
|---|---|---|---|
| 152,758 | 7/1874 | Mills | 47/86 |
| 3,447,261 | 6/1969 | Hundt | 47/77 |
| 3,720,346 | 3/1973 | Cypher | 47/85 |
| 3,858,746 | 1/1975 | Hirota | 47/85 |
| 3,920,144 | 11/1975 | Callen | 47/85 |
| 4,050,188 | 9/1977 | Van Wingerden | 47/85 |
| 4,439,950 | 4/1984 | Kelley | 47/85 |
| 4,785,604 | 11/1988 | Johnson, Jr. | 47/85 |
| 4,887,388 | 12/1989 | Waltel, Jr. | 47/77 |
| 4,926,586 | 5/1990 | Nagamatsu | 47/86 |

*Primary Examiner*—Peter M. Poon
*Assistant Examiner*—Elizabeth Shaw
*Attorney, Agent, or Firm*—Olson & Olson

[57] ABSTRACT

A seedling planter is formed by an elongated hollow container component of square cross section open at its upper end and closed partially at its lower end by crossed webs which provide support for the lower ends of a plurality of elongated tray components each having two joined walls secured together at their lower ends by a bottom wall. Anchor grooves on the lower inner sides of the container side walls slidably receive the lower edges of the tray components, with the inner sides of the tray walls facing the inner sides of a pair of adjacent walls of the container component. Four tray components thus are receivable removably in the container component, and plant growth medium may be filled into the four components formed by the four tray components and confronting walls of the container component. Seeds deposited in the growth medium grow into seedlings, and each seedling with its growth medium is removable with its associated tray component from the container component. The seedling with its growth medium then may be removed from its tray component for transplant at a desired site.

6 Claims, 2 Drawing Sheets

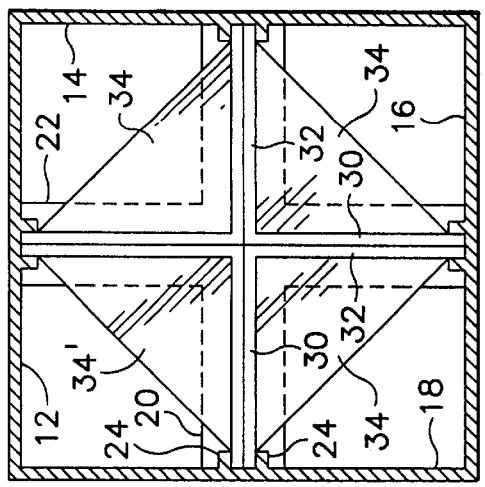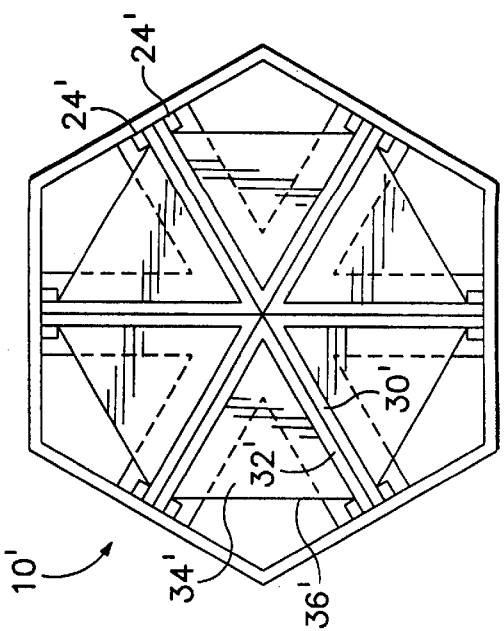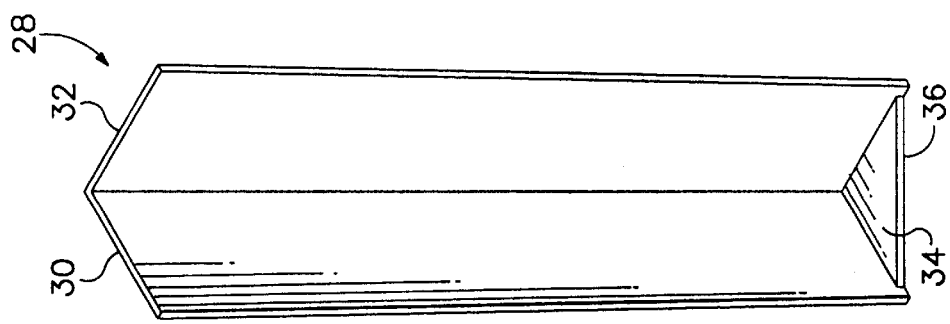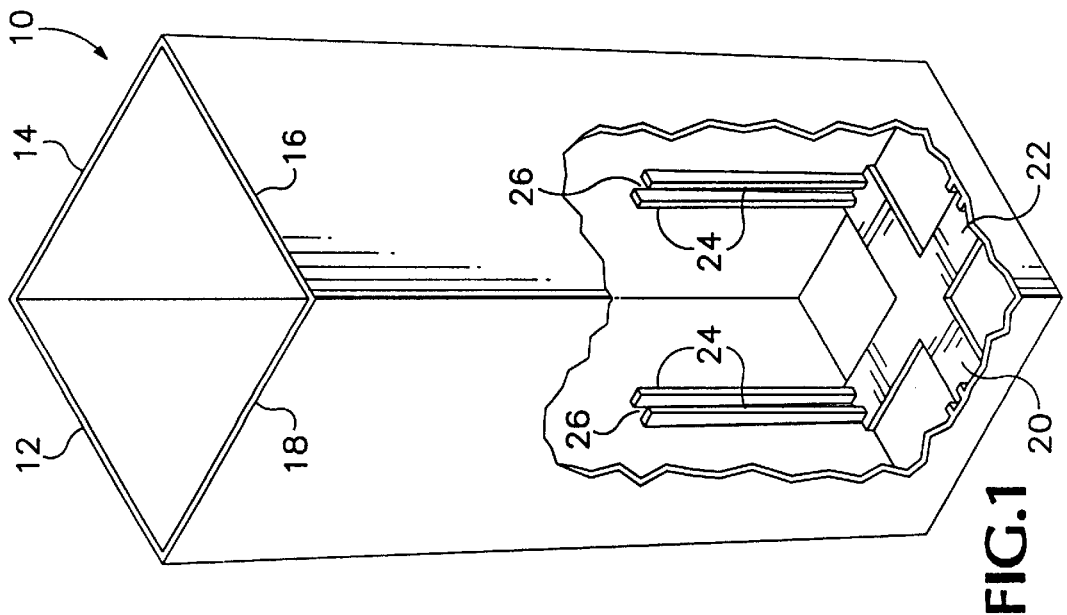

SEEDLING PLANTER

BACKGROUND OF THE INVENTION

This invention relates to the planting of seedlings, and more particularly to a novel container in which to plant and grow seedlings preliminary to transplant.

My earlier patent, U.S. Pat. No. 5,412,907 discloses an elongated container of square cross section in which is removably supported a pair of detachably interconnected plates which form with the container four compartments for the reception of plant growth medium for the growing of seedlings in the four compartments. Grooves on the inner sides of the square container retain the plates in proper orientation. This container works well, but the assembly of plates and the fitting of them into the grooves is a time consuming process which is magnified significantly in large scale operations. Moreover, the removal of the four seedling plantings requires simultaneous removal of both plates from the container, often accompanied by breakage of the compacted planting medium.

SUMMARY OF THE INVENTION

The seedling planter of this invention is formed of an elongated hollow container component open at the outer end and closed partially at the inner end for supporting a plurality of tray components. The tray components form with the walls of the container component a plurality of elongated compartments for receiving plant growth medium. Each tray component is removable from the container component independently of the others, for easy removal of the plant growth medium and a seedling grown therein, for transplant.

It is the principal objective of this invention to provide a seedling planter of the class described in which the plurality of tray components are retained securely in cooperative registration with the associated adjacent walls of the container component.

Another objective of this invention is the provision of a seedling planter of simplified construction for economical manufacture, for quick and easy assembly and ready removal of each tray for transport to a site of seedling transplant.

These and other objects and advantages of this invention will appear from the following detailed description, taken in connection with the accompanying drawings of preferred embodiments.

BRIEF DESCRIPTION OF THE DRAWINGS

FIG. 1 is a perspective view of a container component of a seedling planter embodying the features of this invention, a portion being broken away to disclose internal structural details.

FIG. 2 is a perspective view of a tray component for cooperative association with the container component of FIG. 1.

FIG. 3 is a plan view of the assembly of four tray components of FIG. 2 in the container component of FIG. 1.

FIG. 5 is a plan view similar to FIG. 3 but showing a container component of hexagonal periphery and tray components of complimentary shape.

DESCRIPTION OF THE PREFERRED EMBODIMENTS

Figure 4:
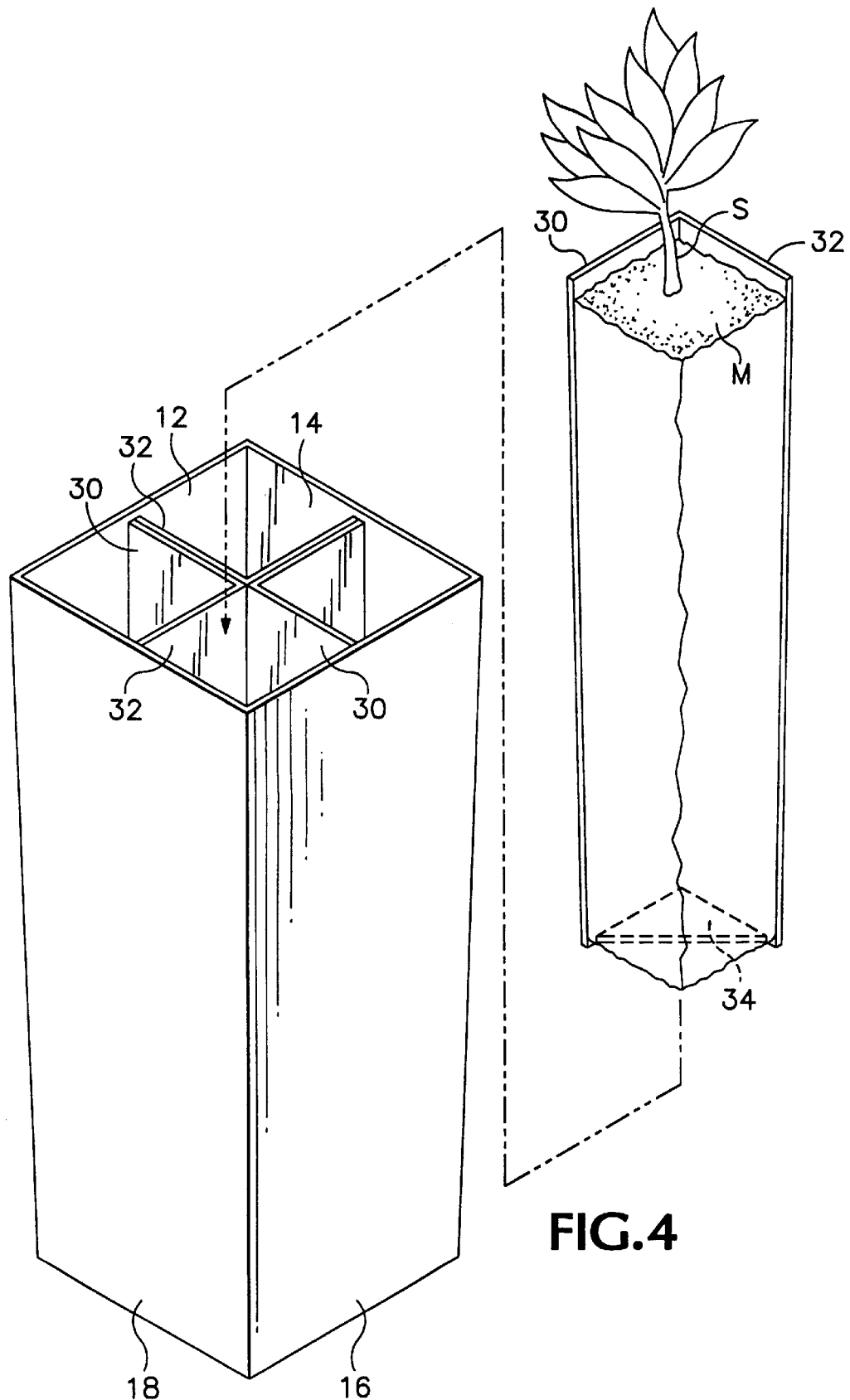
FIG. 4 is an exploded perspective view illustrating the manner of removing a tray component from the container component in preparation for transplanting a seedling.

In the preferred embodiment illustrated in FIGS. 1–4 of the drawings, there is shown an elongated hollow container component 10 of square cross section formed of four walls 12, 14, 16 and 18. The outer end of the container component is open and the inner end is closed partially by narrow webs 20 and 22 which span said inner end at right angles to each other. The webs are joined to the walls centrally of their width, and each web registers with a pair of raised ribs 24 which extend from the inner end of each wall a short distance toward the upper end thereof. The ribs of each pair are spaced apart to form an anchor groove 26 configured to receive the adjacent walls of a pair of tray components 28 now to be described.

Each of the four tray components 28 is formed of a pair of elongated walls 30, 32 joined along one longitudinal edge and forming between them an included angle of 90°. Accordingly, the tray is of V-shape. The inner ends of the walls are joined together by a bottom wall 34. The outer edge 36 of the bottom wall terminates slightly inward of the outer edges of the walls 30, 32 to allow said outer edges to enter anchor grooves 26 in adjacent walls of the container component. This is best illustrated in FIG. 3.

It is preferred that the ribs 24 diverge slightly toward the outer end of the container component, to facilitate entry of the tray walls into the anchor grooves. It also is preferred that the upper end of each tray component 28 diverge slightly more than 90°, to insure that the walls of all of the four tray components bear positively against each other at their upper ends when installed in the container component 10.

To prepare the seedling planter for use, a tray component 28 is inserted into the container component 10 at one corner thereof, with the inner sides of walls 30, 32 facing the inner sides of a pair of walls (for example walls 16 and 14, respectively), of the container component. The inner ends of the tray walls are guided into the anchor grooves 26 and the bottom wall 34 is brought into abutment with the webs 20, 22.

A second tray component 28 then is inserted into the container component, in the same manner as the first tray component just described, with tray wall 30 abutting tray wall 32 of the first tray component and with the inner edge of wall 30 inserted into the same anchor groove 26 occupied by the inner edge of the wall 32 of the first tray component.

The third and fourth tray components are installed, sequentially, in the same manner as the second tray component, to complete the assembly best shown in FIG. 3. With the upper ends of the tray components diverging slightly more than 90°, as preferred, they are brought into close resilient abutment to insure against plant growth medium entering between them.

The completed assembly now may be filled with plant growth medium M (FIG. 4) and seeds planted therein. The planted assembly is stored for periodic attendance until the seedling S is ready for transplant at a permanent site. There the planter is disassembled by removing one filled tray component at a time, as illustrated in FIG. 4. The compacted plant growth medium with seedling is removed easily from the V-shaped tray component through its open sides.

FIG. 5 is included to illustrate the diversity of peripheral shapes that may be utilized for the container component. In FIG. 5 the peripheral shape of the container component 10' is hexagonal, and the walls 30', 32' of each V-shaped tray component 28' form between them a complimentary included angle of 60°. The outer edges of the tray walls are anchored removably in grooves provided by spaced ribs 24' located at the lateral center of each of the six plane segments of the hexagon.

It will be apparent to those skilled in the art that various modifications and changes may be made in the size, shape, type, number and arrangement of parts described hereinbefore. For example, the bottom wall 34 of the tray component may be of square shape rather than the triangular shape illustrated. The webs 20, 22 may be formed as a grid of any desired configuration. The length of the container and tray components may be varied over a wide range, as dictated by the end use of the assembly. Although the square configuration of the container component illustrated in FIGS. 1–4 of the drawings is preferred, FIG. 5 illustrates that many other polygonal shapes and, indeed, a circular shape, may be utilized, as desired. These and other changes may be made without departing from the spirit of this invention and the scope of the appended claims.

I claim:

1. A seedling planter comprising:

a) a hollow container component having a peripheral wall and an open upper end, b) tray support means on the lower end of the container component for supporting a plurality of individual, separated tray components in said container component, c) a plurality of V-shaped tray components separated from each other and each having a pair of walls joined along one mutual edge and diverging outwardly therefrom, and a bottom member joining the pair of walls at the lower ends thereof, and d) anchor means on the inner side of the container component for releasably securing the outer edges of the walls of each V-shaped tray component to the container component, with the inner surfaces of the walls of each tray component facing the inner surface of the container component and with the outer surfaces of the walls of the tray components in substantial abutment with each other, whereby growth medium may be filled into the assembly of trays in the container, through the open upper ends of the trays and container, and a seedling planted in the growth medium at the upper open end of each tray, each individual tray being removable from the container for transport to a planting site and the seedling and growth medium removed from the open side of the tray for transplant.

2. The seedling planter of claim 1 wherein the tray support means comprises a plurality of crossed webs at the lower end of the container component.

3. The seedling planter of claim 1 wherein the hollow container component is square in cross section and the pair of walls of each V-shaped tray component form between them an included angle of 90°.

4. A seedling planter comprising:

a) a hollow container component having a peripheral wall and an open upper end, b) tray support means on the lower end of the container component for supporting a plurality of tray components in said container component, c) a plurality of tray components each having a pair of walls joined along one mutual edge and diverging outwardly therefrom, and a bottom member adjoining the pair of walls at the lower ends thereof, and d) longitudinal anchor grooves on the inner sides of the peripheral wall of the container component for releasably securing the outer edges of the walls of each trap component to the container component, with the inner surfaces of the walls of each trap component facing the inner surface of the container component and with the outer surfaces of the walls of the tray components in substantial abutment with each other.

5. The seedling planter of claim 4 wherein each of said grooves is configured to receive the outer edges of a the pair of walls of adjacent tray components.

6. A seedling planter comprising:

a) a hollow container component of square cross section having a peripheral wall and an open upper end, b) a plurality of tray support crossed webs on the lower end of the container component for supporting a plurality of tray components in said container component, c) a plurality of tray components each having a pair of walls joined along one mutual edge and diverging outwardly therefrom and forming between them an included angle of 90°, and a bottom member adjoining the pair of walls at the lower ends thereof, and d) longitudinal anchor grooves on the inner sides of the peripheral wall of the container component, each of said grooves being configured to receive the outer edges of the pair of adjacent tray components for releasably securing the outer edges of the walls of each tray component to the container component, with the inner surfaces of the walls of each tray component facing the inner surface of the container component and with the outer surfaces of the walls of the tray components in substantial abutment with each other.

* * * * *